(12) United States Patent
Banerjee et al.

(10) Patent No.: US 11,275,697 B2
(45) Date of Patent: Mar. 15, 2022

(54) TRANSLATION LOOKASIDE BUFFER INVALIDATION FOR MERGED INVALIDATION REQUESTS ACROSS POWER BOUNDARIES

(71) Applicant: Apple Inc., Cupertino, CA (US)

(72) Inventors: Kutty Banerjee, San Jose, CA (US); Pratik Chandresh Shah, Santa Clara, CA (US); Tatsuya Iwamoto, Foster City, CA (US); David E. Roberts, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 16/786,231

(22) Filed: Feb. 10, 2020

(65) Prior Publication Data

US 2020/0379920 A1    Dec. 3, 2020

Related U.S. Application Data

(60) Provisional application No. 62/855,456, filed on May 31, 2019.

(51) Int. Cl.
*G06F 12/1027*    (2016.01)

(52) U.S. Cl.
CPC .... *G06F 12/1027* (2013.01); *G06F 2212/683* (2013.01)

(58) Field of Classification Search
CPC ........... G06F 12/1027; G06F 2212/683; G06F 2212/1024; G06F 2212/302; G06F 2212/682

USPC ................ 711/133, 206, 167; 713/300, 400; 710/260

See application file for complete search history.

(56) References Cited

U.S. PATENT DOCUMENTS

| | | | |
|---|---|---|---|
| 4,727,482 A * | 2/1988 | Roshon-Larsen | G06F 12/1063 711/202 |
| 8,909,946 B2 | 12/2014 | Oney | |
| 10,733,110 B1 * | 8/2020 | Volpe | G06F 3/0616 |
| 2002/0069328 A1 | 6/2002 | Chauvel | |
| 2013/0019080 A1 * | 1/2013 | Levinsky | G06F 12/1027 711/206 |
| 2013/0212313 A1 * | 8/2013 | Cota-Robles | G06F 9/30076 711/6 |
| 2013/0339657 A1 * | 12/2013 | Greiner | G06F 9/30047 711/207 |
| 2014/0068225 A1 * | 3/2014 | Plondke | G06F 12/1027 711/207 |

* cited by examiner

*Primary Examiner* — Hong C Kim
(74) *Attorney, Agent, or Firm* — Blank Rome LLP

(57) ABSTRACT

One disclosed embodiment includes a method for memory management. The method includes receiving a first request to clear one or more entries of a translation lookaside buffer (TLB), receiving a second request to clear one or more entries of the TLB, bundling the first request with the second request, determining that a processor associated with the TLB transitioned to an inactive mode, and dropping the bundled first and second requests based on the determination.

20 Claims, 3 Drawing Sheets

US 11,275,697 B2

TRANSLATION LOOKASIDE BUFFER INVALIDATION FOR MERGED INVALIDATION REQUESTS ACROSS POWER BOUNDARIES

BACKGROUND

The disclosed subject matter relates to the field of memory management. More specifically, but not by way of limitation, the disclosed subject matter relates to power aware translation lookaside buffer (TLB) invalidation optimization.

Computers and other computational devices typically have at least one programmable processing element that is generally known as a central processing unit (CPU). They frequently also have other programmable processors that are used for specialized processing of various types, such as graphic processing operations, which may be performed by graphic processing units (GPUs). GPUs generally comprise multiple cores or processing elements designed for executing the same instruction on parallel data streams, making GPUs more effective than general-purpose CPUs for algorithms in which processing of large blocks of data is done in parallel. In general, a CPU functions as the host and hands-off specialized parallel tasks to the GPUs or other specialized processors, such as a neural engine or processor.

Both the CPU and the GPU need computer memory in order to operate. Computer memory, in the form of a cache or random-access memory (RAM), is used as a temporary storage area for data and instructions that are needed by the CPU and GPU. Generally, modern computer memory can be large, with millions or billions of bytes available for storage. To help manage the available memory, address translation is often used. Address translation may be used for various reasons, such as to help speed access to memory, provide access to a larger virtual memory than is actually available, and/or allow multiple memory requestors, such as different processes executing on the CPU or GPU, to share a memory. A memory requestor may transmit a memory request using a virtual address, and an address translation mechanism may translate the virtual address to a corresponding physical address for the memory.

SUMMARY

One disclosed embodiment includes a method of memory management, the method includes receiving a first request to clear one or more entries of a translation lookaside buffer (TLB). The method further includes receiving a second request to clear one or more entries of the TLB. The method also includes bundling the first request with the second request. The method further includes determining that a processor associated with the TLB transitioned to an inactive mode. The method also includes dropping the bundled first and second requests based on the determination.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable device. In other embodiments, such instructions may be implemented by an electronic device, e.g., a device, comprising a memory and one or more processors operatively coupled to the memory, wherein the one or more processors are configured to execute the instructions.

DETAILED DESCRIPTION

Figure 1:
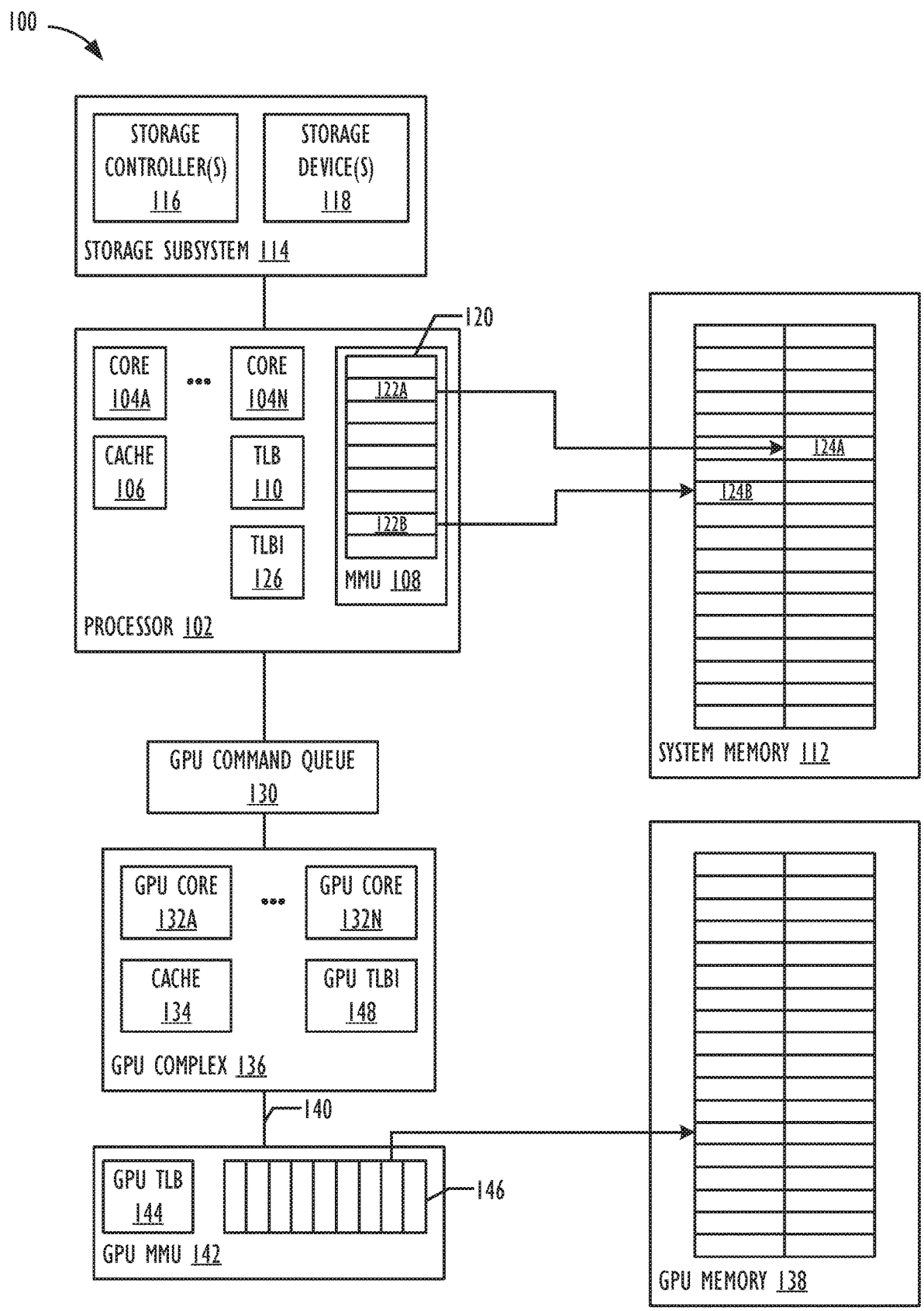
FIG. 1 is a block diagram illustrating a computer system, in accordance with aspects of the present disclosure.

In the following description, for purposes of explanation, numerous specific details are set forth in order to provide a thorough understanding of the invention. It will be apparent, however, to one skilled in the art that the disclosed examples may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment, and multiple references to "one embodiment" or "an embodiment" should not be understood as necessarily all referring to the same embodiment.

As used herein, the term "a computer system" refers to a single computer system or a plurality of computer systems working together to perform the function described as being performed on or by a computer system. Similarly, a machine-readable medium can refer to a single physical medium or to a plurality of media that may together contain the indicated information stored thereon. Reference to a processor refers to a single processing element or to a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of systems having the benefit of this disclosure and being of ordinary skill in the design and implementation of computing systems and/or graphic systems.

As discussed above, a memory requestor may transmit a memory request using a virtual address, and an address translation mechanism may translate the virtual address to a corresponding physical address for the memory. Typically, the virtual to physical address translations are stored in a set of software-managed page tables in memory. The virtual address can be used as an index (relative to a base address of the page table) from which a page table entry or entries is read, in order to locate the correct translation. Some address translation schemes use multiple page table reads in a hierarchical or non-hierarchical fashion to locate a translation. Other schemes can use a single page table read to locate a translation.

The latency for performing the translation can be reduced by providing a translation lookaside buffer (TLB) that caches recently used translations for rapid access in response to a memory request from a requestor. However, the TLB is a finite resource, and can be shared by multiple requesters. Thus, the TLB is subject to potential interference by different requestors (e.g. different requestors, using different translations, can dislodge recently used translations corresponding to other sources). The competition for TLB space can reduce overall performance by increasing the latency for memory requests among the requestors.

TLB resource management may be improved by invalidating contents of the TLB. Timely invalidating TLB entries can clear no longer needed TLB entries. Additionally, clearing TLB entries can be useful to prevent potential security issues when a TLB is shared as among multiple applications. TLB invalidation requests may be sent to the TLB, instructing the TLB to invalidate various, or all, entries in the TLB. However, processing TLB invalidation requests takes up time and processing resources and it may be desirable to optimize how TLB invalidation requests are utilized.

Referring to FIG. 1, the disclosed embodiments may be performed by representative computer system 100. For example, the representative computer system 100 may act as a software development platform, an end-user device, or a server device. While FIG. 1 illustrates various components of a computer system, it is not intended to represent any particular architecture or manner of interconnecting the components as such details are not germane to the present disclosure. Network computers and other data processing systems (for example, computers, personal digital assistants (PDAs), smartphones, tablets, laptops, cellular telephones, entertainment systems and other consumer electronic devices, etc.) which have fewer components or perhaps more components may also be used to implement one or more embodiments.

As illustrated in FIG. 1, computer system 100 includes a processor 102 having one or more cores 104A-N, a processor cache 106, a processor memory management unit (MMU) 108 with a translation lookaside buffer (TLB) 110, and a TLB invalidation (TLBI) controller 126. The system further includes a physical system memory device 112 and a storage subsystem 114, including one or more storage controllers 116 coupled to one or more persistent storage devices 118. It may be understood that while processor 102 is shown here configured with the MMU 108, the TLB 110, and the TLBI controller 126, the MMU 108, TLB 110, and TLBI controller 126 may be located separate from the processor 102, for example, in one or more chip of a set of chips, sometimes referred to as a chipset, which facilitate and control communications between the processor 102, system memory 112, and various other components which may make up the computer system 100. For example, the TLB 110 may be configured as a part of the MMU 108 and the MMU 108 may be connected to the processor 102 via a bus, in a manner similar to GPU MMU 142, GPU complex 136, and GPU bus 140. In certain cases, the processor 102, MMU 108, GPU complex 136, GPU bus 140, and the GPU MMU 142 may be separate portions of, but reside within, a single system-on-a-chip (SoC).

The MMU 108 of processor 102 can be configured to accelerate virtual memory to physical memory address translation in hardware. The MMU 108 includes one or more page tables 120 that point to addresses in the physical system memory device 112. Each page table 120 is a data structure that contains multiple page table entries (PTE) containing the physical address of a page of memory. In this example, PTE 122A and PTE 122B, respectively, contain the physical address of pages 124A and 124B of system memory 112. The size of a memory page can vary based on system configuration and processor architecture. Each page table is indexed by the virtual address of the page of memory. Data from the page table 120 can be cached in the TLB 110 to further accelerate address translation.

The MMU 108 uses data in the TLB 110 or in the page table 120 in memory to translate a given input virtual address into an output physical address if a physical memory address exists in the physical system memory device 112 for the given virtual address. A virtual memory address contains several bits, the number of bits corresponding to the size of the virtual address space. A portion of the bits can correspond to a virtual page related to the memory address, and a portion of the bits can correspond to a memory offset within the page, depending on the virtual memory configuration of the system. A 64-bit virtual memory system can use up to 64 bits of address space, allowing over 18 exabytes of addressable space. Accordingly, the virtual memory system can enable an operating system of a computing device to address significantly more memory than physically included in the system.

In certain embodiments, upon the TLB 110 determining that the stored page tables do not include the desired mapping, the MMU 108 is configured to send a page table request to the memory 112 and receives, in response, a page table that includes the desired mapping. In various embodiments, upon translating a virtual address, MMU 108 sends a request for data, which includes the physical address, to the memory 112. The TLBI controller 126 may be configured to flush or invalidate the TLB 126.

Computer system 100 of FIG. 1 also includes a GPU command queue 130, a GPU complex 136, and GPU MMU 142. The GPU complex 136 includes GPU cores 132A-132N (collectively 132), and a L1 GPU cache 134. The GPU complex 136 and the GPU MMU 142 may be on a separate power domain as compared to the processor 102, and the power for the GPU complex 136 and GPU MMU 142 may be managed separately from the processor 102. For example, the GPU complex 136 and GPU MMU 142 may be powered down independently from the processor 102 and vice versa. In certain cases, the GPU command queue 130 may be on the same power domain as the GPU complex 136.

In certain embodiments, GPU complex 136 may have several GPU cores 132A-132N and a single L1 GPU cache 134, or separate L1 GPU caches 134 for each GPU core 132. In some embodiments, GPU complex 136 transmits and receives data and instructions from GPU memory 138 via GPU bus 140 and GPU MMU 142. The GPU MMU 142, in certain embodiments, includes a GPU TLB 144 and one or more GPU page tables 146. Similar to page table 120, each GPU page table 146 is a data structure that contains multiple PTE containing the physical address of a page of GPU memory 138. In certain embodiments, the GPU command queue 130 and/or GPU MMU 142 may be integrated into the GPU complex 136, similar to as shown with MMU 108 and processor 102. In certain cases, the GPU command queue 130, GPU complex 136, and GPU MMU 142 may be integrated with processor 102 and/or storage subsystem 114 in a single SoC. In certain cases, the GPU memory 138 may be integrated with and comprise a portion of system memory 112. In such cases, the combined memory may include a single MMU and TLBI controller for handling both GPU and CPU memory operations.

In certain embodiments, The GPU complex 136 includes a GPU TLBI controller 148 which, like the TLBI controller 126, may be configured to flush or invalidate the GPU TLB 144. In certain embodiments, GPU TLBI controller 148 may be circuitry separate from GPU complex 136. For example, the GPU TLBI controller 148 may be integrated into the GPU MMU 142. In certain embodiments, the TLB 110 and GPU TLB 114, along with TLBI 126 and GPU TLB 144, may be integrated into a single TLB and TLBI. In certain embodiments, the GPU MMU 142 may be integrated with the MMU 108 into a combined MMU and the GPU TLB 144 integrated with the GPU complex 136.

Generally, MMUs manage virtual memory for processes being executed by one or more processors. For example, the MMU performs virtual address translations for a virtual memory address of a process and returns a physical address if the data referenced by the virtual memory address is stored in the memory, which may be system, GPU, or a combined system/GPU memory. If the data referenced by the virtual memory address is not stored in the memory but instead is stored in the persistent storage, the MMU pages in the stored pages corresponding to this virtual memory address into the memory.

The MMU may also be configured to manage the working set of one or more processors. The working set of a processor is a set of pages that the processor is using (or not currently using). Each page is a variable or fixed length contiguous block of virtual memory. Virtual memory allows a page that does not currently reside in memory to be addressed and used. If a process tries to access a location in such a page, an exception called a page fault is generated. The MMU is notified and loads the required page from the persistent storage. The process addressing this virtual memory does not need to have knowledge of a page fault as the MMU handles the paging for the process. Managing the working set is determining which of the pages resident in the memory should be kept resident or evicted to persistent storage. For example, the MMU can determine which pages for the CPU have not been used recently and select one or more of these pages to be paged out to persistent storage.

In certain cases, one or more MMUs maintain the TLB coherency of the different TLBs, such as a TLB for the CPU and TLB for the GPU. While the example discussed herein addresses a TLB is associated with a particular processor and memory, it can be understood that the techniques discussed may be applied more generally to TLBs associated with multiple processors and/or memories, as well as multi-level or multiple TLBs. In certain embodiments, overall TLB system coherency ensures that TLBs have consistent data. Generally, a TLB is a cache that stores recently used virtual address translations. If a virtual memory address translation becomes invalid (e.g., the page corresponding to a virtual address is evicted from physical memory), the MMU signals to the TLB via the respective TLB invalidation controller, respectively, to invalidate a TLB entry corresponding to this virtual memory address translation. As another example, where an operating system is performing an operation where the page contents need to be "stable," such as copying the memory, and needs a coherent snapshot of the memory without interference by another CPU or GPU, the memory manager may invalidate the translations for corresponding memory addresses.

The MMU may also invalidate TLB entries based on a received invalidation request. For example, one or more TLB entries may correspond to one or more memory pages storing an object such as a bitmap image or texture. After the object is used, it may be desirable to clear references to the object from TLB. In this example, an application using the object may request that the TLB entries for the object be cleared. In response, the MMU may invalidate the corresponding TLB entries. Invalidating TLB entries can be a relatively resource expensive task. For example, a CPU executing the application may issue each TLB invalidate (TLBI) request for a page to the memory system of a GPU, which may have to go through a particular bus to the GPU subsystem, which may operate at a different speed than the CPU. The GPU MMU may then process the TLBI, which ties up the MMU and TLB, and then, after the TLBI request returns, the CPU may then issue another TLBI request for the next page, and so forth.

Figure 2:
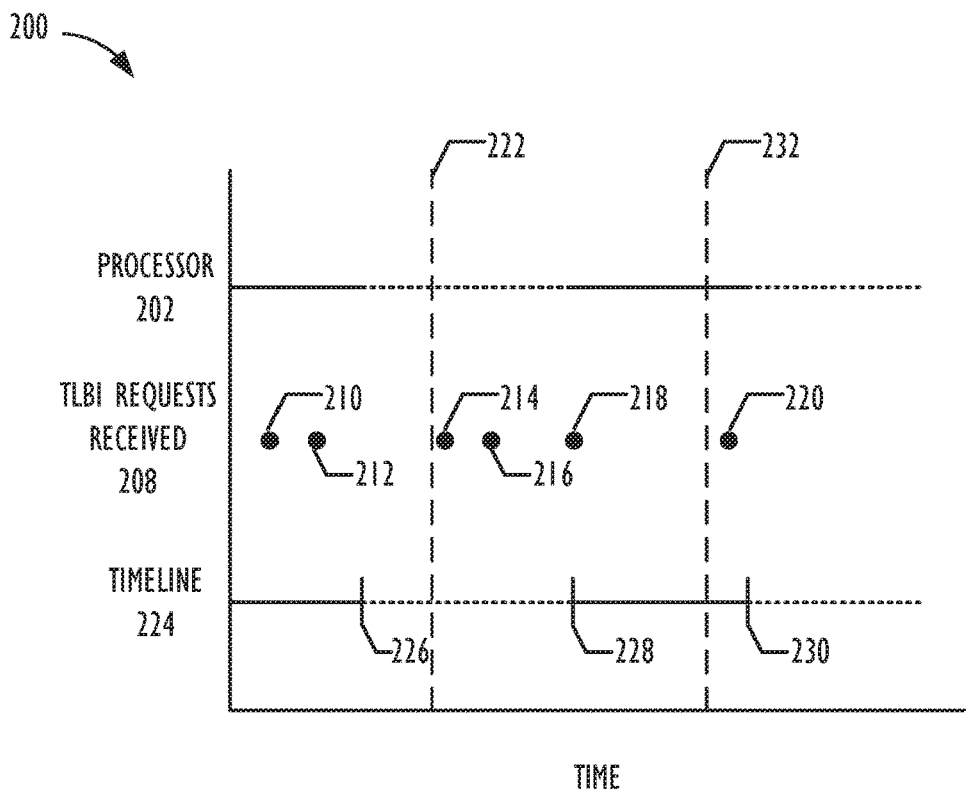
FIG. 2 is a timeline illustrating TLBI requests, in accordance with aspects of the present disclosure.

FIG. 2 is a timeline 200 illustrating exemplary TLBI requests, in accordance with aspects of the present disclosure. It may be desirable to drop or ignore TLBI requests in certain cases. When a processor, such as a CPU and/or GPU, enters a powered down state and/or power saving mode (referred to collectively herein as a processor "inactive mode"), information in the TLBs corresponding to the processor may be considered invalid. Generally, the processor may be powered down or enter a power saving mode, such as a sleep or suspend mode in certain circumstances, such as when there is no work to be done or a user-initiated power saving mode. Generally, as power saving modes are associated with lower workloads, the TLB may be powered down or not refreshed, invalidating their contents. In this example, the time a processor 202, such as a GPU, is in an active mode is represented by solid line 204 and the time the processor 202 is inactive mode is represented by dashed line 206. The time a TLBI request is received is represented by TLBI requests 210-220. In certain cases, a TLB corresponding to the processor 206 may be cleared as a part of entering the power saving mode. For example, the TLB may include volatile memory and may also be powered down in the power saving mode, and thus the TLB is clear when exiting the power saving mode. In certain cases, TLBI requests, such as TLBI request 214, received while the corresponding processor 202 is in a power inactive mode can be effectively dropped or ignored, for example by the MMU, as the corresponding TLB will be clear when the processor 202 exits the power inactive mode, meaning there are no entries to invalidate.

To make invalidating multiple TLB pages more efficient, invalidation requests may be batched (e.g., bundled). In certain cases, executing multiple TLBI requests as a batch may be more efficient than handling each TLBI request individually as TLBI requests are strongly ordered instructions and it is desirable to send as few instructions as possible, with each instruction performing as much work as possible. Thus, efficiency may be improved by sending, a single instruction to invalidate a 128 KB range, rather than eight instruction to invalidate different 16 KB ranges. For example, a first application executing on a CPU may send a first TLBI request to invalidate a first one or more entries for a TLB, such as a GPU TLB. An entity, such as a GPU driver, operating system, or another component, such as a MMU, configured to handle TLBI requests may receive the first TLBI request 210. This entity may receive a second TLBI request 212 from either the first application, another application, or some other entity to invalidate a second one or more entries for the TLB. The entity may bundle the first TLBI request 210 and the second TLBI request 212 together into a batch request and send the batched request to the TLB to invalidate the first and second one or more entries.

In accordance with aspects of the present disclosure, bundled TLBI requests may fall across power boundaries where the processor 202 is in the inactive mode 206. For example, the entity, at time reference 222, may attempt to bundle TLBI requests 210, 212, and 214. However, as the processor 202 is in the inactive mode 206, TLBI requests 210, 212, and 214 may be irrelevant as the TLB was cleared when the processor entered into the inactive mode at time reference 222. It may be advantageous for the entity to drop the TLBI requests, rather than sending certain invalidation requests to the TLB that are no longer relevant or necessary.

According to certain aspects, the entity may maintain a timeline 224 to help track which TLBI requests may be safely dropped. For example, a received TLBI may arrive while the processor 202 is in active mode 204, but, after batching, the processor 202 is in inactive mode 206, or vice-versa. The timeline 224 may include times where the processor 202 transitions to the inactive mode 206, shown here at timeline entries 226 and 230. The timeline 224 may also include time(s) where the processor 202 transitions to the active mode 204, shown here at entry 228. The entity, after receiving TLBI request 210, associates a first timestamp with TLBI request 210 indicating that TLBI request 210 arrived while processor 202 was in active mode 204. The timestamp may be any marker that may be used to correlate the time the TLBI request 210 arrived with processor 202. For example, the timestamp may be a time indicating when the TLBI request 210 arrived, an indication that the TLBI request 210 arrived while processor 202 was in active mode 204, a counter or alphanumeric indicator tracking epochs when the processor is in active mode 204, or some other indicator.

The entity may be configured to bundle TLBI requests to help increase MMU and TLB efficiency. After the entity receives TLBI request 212, the entity may associate a second timestamp with TLBI request 212 and then attempt to bundle TLBI request 210 and TLBI request 212 together. Prior to finishing bunding at time reference 222, the processor 202 enters the inactive mode 206. The entity may then add an entry 226 to the timeline 224 indicating that the processor 202 entered into the inactive mode 206. After the entity finishes bundling at time reference 222, the entity may compare the timestamps associated with the bundled TLBI requests 210 and 212 with entry 226 of timeline 224, indicating the time that the processor 206 entered into the inactive mode 206. The entity may then determine that both bundled TLBI requests 210 and 212 occur either before the processor 202 entered the inactive mode 206 or that the processor 202 is now, at time reference 222, in the inactive mode 206. The bundled TLBI requests 210 and 212 may then be dropped. Similarly, where a bundle includes a TLBI request 214 that arrives while the processor is in the inactive mode 206, the TLBI request 214 from the bundle may also be dropped. In certain cases, TLBI requests that arrive while the processor 202 is in the inactive mode 206, such as TLBI requests 214 and 216 may be dropped without bundling the requests.

In certain cases, bundled TLBI requests may cross multiple power boundaries. For example, the entity may receive and bundle TLBI requests 212, 214, 216, and 218. The entity may then determine, at time reference 232, that TLBI requests 212, 214, and 216 are associated with timestamps that occur prior to entry 228 of timeline 224, when the processor 202 entered into active mode 204, for example, by walking a buffer of TLBI requests and determining which bundled TLBI requests occurred prior to the processor 202 reentering active mode 204. The entity may also determine that TLBI request 218 is associated with a timestamp that occurs equal to or after the processor 202 entered into active mode 204 at time entry 228. The entity may thus drop TLBI requests 212, 214, and 216 from the bundle and either send off TLBI request 218 or hold TLBI request 218 to bundle with another, later arriving TLBI request, such as TLBI request 220 (unless or until another processor inactive mode is entered into, such as at time entry 230).

Figure 3:
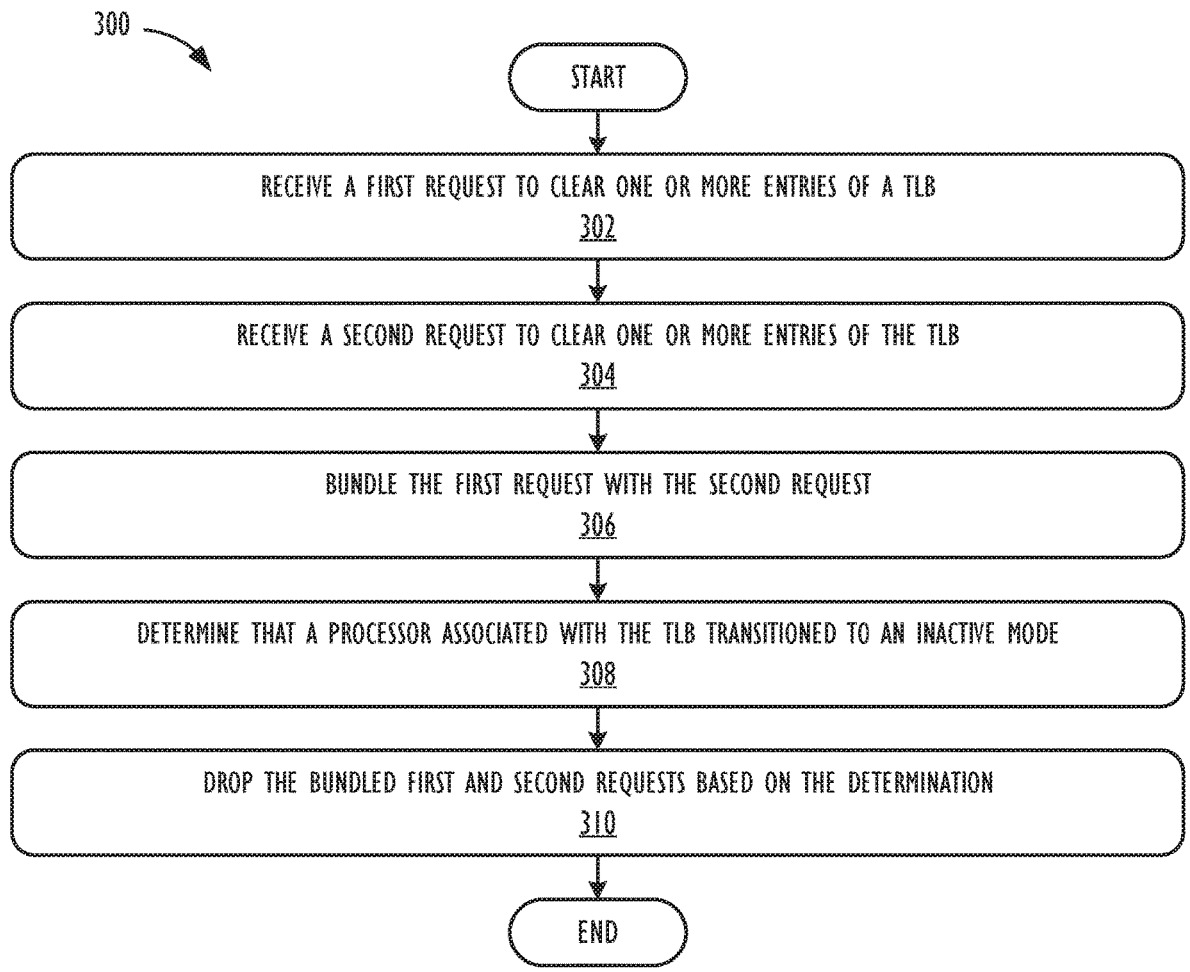
FIG. 3 is a flow diagram illustrating a technique for memory management, in accordance with aspects of the present disclosure.

FIG. 3 is a flow diagram illustrating a technique for memory management, in accordance with aspects of the present disclosure. At step 302, the technique proceeds by receiving a request to clear one or more entries of a TLB. For example, an entity, such as a driver, may receive a request to clear a TLB entry from, for example, an application. At step 304, the technique proceeds by receiving a second request to clear one or more entries of a TLB. For example, the entity may receive a second request to clear a TLB entry from the application, or another entity. At block 306, the technique continues by bundling the first request with the second request into a batch. For example, the entity may be configured to bundle requests to clear TLB entries to help make such operations more efficient. This bundling may be, for example, based on a number of requests, a time between requests, or some other technique for bundling such requests. At block 308, the technique continues by determining that a processor associated with the TLB transitioned to an inactive mode. For example, the entity may determine that the processor has transitioned to an inactive state either before receiving a request, after receiving the request, or while bundling the request. As the TLB may be cleared when the processor transitions to an inactive state, that the processor may transition to an active state during this determination would not influence the determination. In certain cases, the entity may record a timestamp associated with receipt of each request and compare the timestamps with a timeline indicating when the processor was in an active or inactive mode. At block 310, the technique continues by dropping the bundled first and second requests based on the determination.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed:

1. A method of memory management, comprising:
   receiving a first request to clear one or more entries of a translation lookaside buffer (TLB);
   receiving a second request to clear one or more entries of the TLB;
   bundling the first request with the second request;
   determining that a processor associated with the TLB transitioned to an inactive mode; and
   dropping the bundled first and second requests based on the determination.

2. The method of claim 1, further comprising:
   determining a first timestamp based on a first time associated with receiving the first request;
   determining a second timestamp based on a second time associated with receiving the second request;
   associating the first timestamp with the first request;

associating the second timestamp with the second request; and wherein the determining is based on the first and second timestamps.

3. The method of claim 2, further comprising:

determining a timeline based on a first indication that the processor transitioned to an active mode and a second indication that the processor transitioned to the inactive mode, and wherein the determining is based on a comparison of the first and second timestamps with the timeline.

4. The method of claim 3, further comprising:

receiving a third request to clear one or more entries of the TLB;

bundling the third request with the first and second requests;

determining that the third request was received when the processor was in the active mode based on a comparison of a timestamp associated with the third request and the timeline; and transmitting a TLB invalidation (TLBI) request based on the third request to the TLB.

5. The method of claim 1, wherein the processor transitioned to the inactive mode after receiving at least the first request.

6. The method of claim 1, wherein the processor comprises one of a graphics processing unit or a central processing unit.

7. The method of claim 1, wherein transitioning to the inactive mode comprises clearing the TLB.

8. A non-transitory program storage device comprising instructions stored thereon to cause one or more processors to:

receive a first request to clear one or more entries of a translation lookaside buffer (TLB);

receive a second request to clear one or more entries of the TLB;

bundle the first request with the second request;

determine that a processor associated with the TLB transitioned to an inactive mode; and drop the bundled first and second requests based on the determination.

9. The non-transitory program storage device of claim 8, wherein the instructions further cause the one or more processors to:

determine a first timestamp based on a first time associated with receiving the first request;

determine a second timestamp based on a second time associated with receiving the second request;

associate the first timestamp with the first request;

associate the second timestamp with the second request; and wherein the determining is based on the first and second timestamps.

10. The non-transitory program storage device of claim 9, wherein the instructions further cause the one or more processors to:

determine a timeline based on a first indication that the processor transitioned to an active mode and a second indication that the processor transitioned to the inactive mode, and wherein the determining is based on a comparison of the first and second timestamps with the timeline.

11. The non-transitory program storage device of claim 10, wherein the instructions further cause the one or more processors to:

receive a third request to clear one or more entries of the TLB;

bundle the third request with the first and second requests;

determine that the third request was received when the processor was in the active mode based on a comparison of a timestamp associated with the third request and the timeline; and transmit a TLB invalidation (TLBI) request based on the third request to the TLB.

12. The non-transitory program storage device of claim 8, wherein the processor transitioned to the inactive mode after receiving at least the first request.

13. The non-transitory program storage device of claim 8, wherein the processor comprises one of a graphics processing unit or a central processing unit.

14. The non-transitory program storage device of claim 8, wherein transitioning to the inactive mode comprises clearing the TLB.

15. An electronic device, comprising:

a memory; and one or more processors operatively coupled to the memory, wherein the one or more processors are configured to execute instructions causing the one or more processors to:

receive a first request to clear one or more entries of a translation lookaside buffer (TLB);

receive a second request to clear one or more entries of the TLB;

bundle the first request with the second request;

determine that a processor of the one or more processors associated with the TLB transitioned to an inactive mode; and drop the bundled first and second requests based on the determination.

16. The device of claim 15, wherein the instructions further cause the one or more processors to:

determine a first timestamp based on a first time associated with receiving the first request;

determine a second timestamp based on a second time associated with receiving the second request;

associate the first timestamp with the first request;

associate the second timestamp with the second request; and wherein the determining is based on the first and second timestamps.

17. The device of claim 16, wherein the instructions further cause the one or more processors to:

determine a timeline based on a first indication that the processor transitioned to an active mode and a second indication that the processor transitioned to the inactive mode, and wherein the determining is based on a comparison of the first and second timestamps with the timeline.

18. The device of claim 17, wherein the instructions further cause the one or more processors to:

receive a third request to clear one or more entries of the TLB;

bundle the third request with the first and second requests;

determine that the third request was received when the processor was in the active mode based on a comparison of a timestamp associated with the third request and the timeline; and transmit a TLB invalidation (TLBI) request based on the third request to the TLB.

19. The device of claim 15, wherein the processor transitioned to the inactive mode after receiving at least the first request.

20. The device of claim 15, wherein the processor comprises one of a graphics processing unit or a central processing unit.

\* \* \* \* \*